United States Patent
Andersen et al.

(10) Patent No.: US 10,012,209 B2
(45) Date of Patent: Jul. 3, 2018

(54) METHOD OF DETECTING A DEGREE OF YAW ERROR OF A WIND TURBINE

(71) Applicants: Jimmi Andersen, Holstebro (DK); Jan Martin Jensen, Silkeborg (DK); Johnny Rieper, Horsens (DK)

(72) Inventors: Jimmi Andersen, Holstebro (DK); Jan Martin Jensen, Silkeborg (DK); Johnny Rieper, Horsens (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 795 days.

(21) Appl. No.: 14/108,516

(22) Filed: Dec. 17, 2013

(65) Prior Publication Data

US 2014/0186176 A1    Jul. 3, 2014

(30) Foreign Application Priority Data

Dec. 27, 2012  (EP) ..................... 12199478

(51) Int. Cl.
*F03D 7/02* (2006.01)
*F03D 1/06* (2006.01)

(52) U.S. Cl.
CPC ......... *F03D 7/0204* (2013.01); *F03D 1/0691* (2013.01); *F05B 2270/301* (2013.01);
(Continued)

(58) Field of Classification Search
CPC ................. F03D 1/0691; F03D 7/0204; F05B 2270/301; F05B 2270/3011;
(Continued)

(56) References Cited

U.S. PATENT DOCUMENTS 7,347,668 B2 *  3/2008  Pedersen ............... F03D 7/0204
                                                                416/1
2007/0086893 A1  4/2007  Pedersen
(Continued)

FOREIGN PATENT DOCUMENTS

CN   103649528 A   3/2004
CN   101349240 A   1/2009
(Continued)

OTHER PUBLICATIONS

Thornton Bank Offshore Wind Farm, Annual Activity Report 2011, C-Power, http://www.mumm.ac.be/Common/Windmills/CPOWER2mod/cpower_annual_report_2011.pdf.*

*Primary Examiner* — Woody Lee, Jr.
*Assistant Examiner* — Brian O Peters

(57) ABSTRACT

A method of determining a degree of yaw error of a wind turbine is provided. The method includes obtaining wind pressure measurement values from in front of the rotor plane, which wind pressure measurement values exhibit a periodic nature related to a rotation of a spinner of the wind turbine, performing a signal processing step to process the wind pressure measurement values to determine a phase offset of the wind pressure measurement values relative to an angular reference, and deriving a yaw error angle from the phase offset. A method of establishing a relationship between a phase offset of wind pressure measurement values and a degree of yaw error of a wind turbine, a yaw error determination unit, and a wind turbine are also provided.

15 Claims, 5 Drawing Sheets

(52) U.S. Cl.
CPC ... *F05B 2270/321* (2013.01); *F05B 2270/329* (2013.01); *Y02E 10/721* (2013.01); *Y02E 10/723* (2013.01)

(58) Field of Classification Search
CPC ........ F05B 2270/3015; F05B 2270/321; F05B 2270/329
See application file for complete search history.

(56) References Cited

U.S. PATENT DOCUMENTS

| | | |
|---|---|---|
| 2009/0039651 A1 | 2/2009 | Stiesdal |
| 2009/0068013 A1 | 3/2009 | Birkemose et al. |
| 2012/0186343 A1* | 7/2012 | Egedal .................... F03D 1/008 73/455 |
| 2014/0167415 A1 | 6/2014 | Mykhaylyshyn |

FOREIGN PATENT DOCUMENTS

| | | | | |
|---|---|---|---|---|
| CN | 101387267 A | | 3/2009 | |
| CN | 101389967 A | | 3/2009 | |
| CN | 101598109 A | | 12/2009 | |
| DE | 20114351 U1 | | 12/2001 | |
| EP | 2048507 A2 | | 4/2009 | |
| JP | 2005188455 A | | 7/2005 | |
| WO | WO 2005093435 A1 | | 10/2005 | |
| WO | WO 2009001310 A1 | | 12/2008 | |
| WO | WO2011032606 | * | 3/2011 | .............. F03D 7/00 |
| WO | WO 2012122669 | * | 3/2011 | |

* cited by examiner

METHOD OF DETECTING A DEGREE OF YAW ERROR OF A WIND TURBINE

CROSS REFERENCE TO RELATED APPLICATIONS

The present application claims priority to European Patent Office application No. 12199478.4 EP filed Dec. 27, 2012, the entire content of which is hereby incorporated herein by reference.

FIELD OF INVENTION

The invention describes a method of detecting a degree of yaw error of a wind turbine; a method of establishing a relationship between a phase offset of wind pressure measurement values and a degree of yaw error of a wind turbine; a yaw error detecting unit for detecting a degree of yaw error of a wind turbine, and a wind turbine.

BACKGROUND OF INVENTION

For a wind turbine to optimise its energy output, the wind turbine must be controlled to face directly into the wind. Usually, a wind turbine comprise a number of rotor blades mounted to a spinner at the front of a nacelle, and the nacelle is mounted on top of a tower and can be rotated or "yawed" by a yaw drive. In most prior art wind turbines, the momentary wind direction is estimated using measurement input provided by a weather station mounted on the nacelle. For example, a wind vane is usually used to estimate the wind direction, and this information is translated into yaw drive control commands. However, information from such measurement systems is inaccurate since turbulence caused by the rotor blades means that the data collected by the measurement systems does not reflect the actual situation at the front of the wind turbine or in the rotor plane, i.e. the plane through which the rotor blades move. As a result of these inaccuracies, the nacelle may be turned at a degree of "yaw error", i.e. so that the nacelle, spinner and rotor plane are not facing directly into the wind. The reduction in turbine efficiency resulting from even minor degrees of yaw error can accumulate to result in a significant reduction in annual energy production (AEP). Furthermore, the uneven loading that results from the skewed position of the nacelle, spinner and rotor plane relative to the wind can also significantly increase fatigue loading.

SUMMARY OF INVENTION

It is therefore an object of the invention to provide a more accurate way of aligning a wind turbine relative to the wind.

This object is achieved by the method of of detecting a degree of yaw error of a wind turbine; by the method of establishing a relationship between phase offset and yaw error; by the yaw error detecting unit; and by the wind turbine.

According to the invention, the method of detecting a degree of yaw error of a wind turbine comprises the steps of obtaining wind pressure measurement values from in front of the rotor plane, which wind pressure measurement values exhibit a periodic nature related to a rotation of a spinner of the wind turbine; performing a signal processing step to process the wind pressure measurement values to determine a phase offset of the wind pressure measurement values relative to an angular reference; and deriving a yaw error angle from the phase offset.

An advantage of the method according to the invention of detecting some degree of yaw error is that, with relatively little effort, an exact estimation of the actual yaw error angle can be made, and this information can be used by a yaw drive control unit to correct the orientation of the wind turbine. The method according to the invention therefore provides information that can be used to control the wind turbine to always face essentially directly into the wind, and the energy output of the wind turbine can therefore be optimised, thereby avoiding the revenue losses known from prior art wind turbines. The method according to the invention makes use of a characteristic feature of the wind turbine, namely the rotation of the spinner (and blades) and the impact of wind on the spinner, and derives information from this. In contrast, the prior art measurement systems located behind the rotor plane are in fact disadvantaged by that rotation, since the rotor blades generate turbulence that compromises any measurement made behind the rotor plane.

According to the invention, the method of establishing a relationship between a phase offset of wind pressure measurement values and some degree of yaw error of a wind turbine, which method comprises the steps of
   (A) setting a specific yaw angle;
   (B) obtaining wind pressure measurement values of a periodic nature, related to a rotation of a spinner, for that yaw angle setting;
   (C) processing the wind pressure measurement values to determine a phase offset of the periodic wind pressure measurement values relative to an angular reference;
   (D) recording the phase offset for that yaw angle; and
   (E) repeating steps (A)-(D) for a number of distinct yaw angles.

The method according to the invention is based on the insights that the wind pressure generally exhibits a well-defined behaviour; that alterations in wind pressure can be related to the rotation of the spinner; and that the degree of yaw angle also influences the wind pressure measured at certain locations. An advantage of the method according to the invention of establishing a relationship between the phase offset and the yaw error is that it can be carried out in a straightforward manner. Using the phase offset values determined for the distinct yaw angles during this calibration phase, an actual yaw error angle can later be identified for essentially any phase offset determined during operation of the wind turbine. Any calibration performed on the basis of this method need be performed only once. The accuracy of the calibration can be made favourably high simply by determining phase offset values for a wide range of yaw angles. The knowledge established during the calibration of the wind turbine can remain valid over the lifetime of the wind turbine.

According to the invention, the yaw error detecting unit, for detecting some degree of yaw error of a wind turbine, comprises an input for providing wind pressure measurement values exhibiting a periodic nature related to a rotation of a spinner of the wind turbine; a signal processing unit for processing the wind pressure measurement values to determine a phase offset of the pressure measurement values relative to an angular reference; and an analysis unit for determining a yaw error angle associated with that phase offset.

An advantage of the yaw error determination unit according to the invention is that it is relatively simple to construct and to incorporate in a wind turbine. The yaw error detecting unit according to the invention could also be used to upgrade an existing wind turbine in order to optimise and increase its annual energy production.

According to the invention, the wind turbine comprises a nacelle rotatably mounted on a tower and a yaw drive for rotating the nacelle relative to the tower; a measurement system arranged to obtain pressure measurement values exhibiting a periodic nature related to a rotation of a spinner of the wind turbine, in or on a rotor plane of the wind turbine; and a yaw error detecting unit according to the invention for detecting some degree of yaw error of the wind turbine on the basis of the pressure measurement values.

An advantage of the wind turbine according to the invention is that its orientation into the wind can always be kept optimally correct, i.e. so that a longitudinal axis of the nacelle and spinner is aligned with the wind direction. In this way, the ability of the rotor blades of the wind turbine to extract energy from the wind is best exploited, so that the annual energy production of the wind turbine according to the invention can reach a favourably high level. At the same time, wear and tear on components of the wind turbine such as bearings can be kept to a favourably low level, since uneven loading related to yaw error angle is essentially avoided when the wind turbine faces correctly into the wind.

Particularly advantageous embodiments and features of the invention are given by the dependent claims, as revealed in the following description. Features of different claim categories may be combined as appropriate to give further embodiments not described herein.

As mentioned above, the periodic wind pressure measurement values are obtained from a region preceding the rotor plane, i.e. in front of or upwind from the rotor plane. For example, pressure sensors could be arranged on the outside of a curved spinner nose or cone. As the spinner rotates, the values of pressure measured at the measurement points may oscillate or fluctuate, depending on the degree of yaw error. However, for a conical spinner, the level of information that can be extracted from such pressure measurements may be limited. Therefore, in a particularly preferred embodiment of the invention, the wind pressure measurement values are obtained at a number of measurement points arranged in a front plane of the wind turbine, wherein the front plane precedes or coincides with the rotor plane of the wind turbine. Here, the "front plane" is to be understood to be essentially parallel to the rotor plane, whereby the "rotor plane" is to be understood as a plane described by the path of travel of a rotor blade as it passes through a complete revolution. The "front plane" might even coincide with the rotor plane, depending on how the rotor blades and spinner are connected. A "measurement point" can comprise an opening in the spinner so that the air pressure or wind pressure can be measured by a pressure sensor connected in some suitable way to that opening.

For a particularly preferred embodiment of the invention, the spinner is essentially cylindrical in shape and comprises an essentially flat frontal face. This design has a number of advantages, since the measurement points can be arranged in the same plane, i.e. in the front plane. Furthermore, such a spinner shape is robust, and easier to transport to the wind turbine location since it is less prone to damage. In the following therefore, without restricting the invention in any way, it may be assumed that the spinner windward surface is essentially flat, with minimal curvature, and the front face or windward surface is essentially circular or disc-shaped. In a particularly preferred embodiment of the invention, any components for measuring yaw error are arranged in an interior cavity of the spinner. Preferably, to obtain favourably accurate measurements, any pressure sensors are arranged in a plane parallel to the front plane, and therefore also parallel to the rotor rotational plane. By obtaining wind pressure measurements in such an ideal wind field, a more precise measurement is possible, and therefore also a more precise determination of the actual momentary yaw error angle, so that corrective measures can be determined to increase AEP and reduce fatigue loading. Of course, if the measuring device cannot be arranged in a plane parallel to the rotor rotational plane, for whatever reason, a suitable correction or compensation can be performed on the measured pressure values.

The pressure measurement values can be obtained in any suitable manner. For example, a number of pressure sensors may be used. A pressure sensor might be, for example, a pressure transducer, a pressure transmitter, etc. Off-the-shelf pressure sensors or pressure transmitters are widely available. A pressure sensor can be based on various sensing techniques, for example a pressure sensor can comprise one or more Bourdon gauges, piezo-resistive strain gauges, etc. Such a gauge can be positioned at any suitable measurement point for measuring pressure in front of the rotor rotational plane. A pressure sensor can be located directly behind a measurement point, or can be located at a distance from it. For example, an airtight tube or duct can lead from an opening at a pressure measurement point, arranged in the front plane, to a pressure sensor behind the front plane.

In a further preferred embodiment of the invention, a wind pressure measurement value preferably comprises a pressure differential between a first pressure value obtained at a first measurement point arranged essentially at the centre of the spinner and a second pressure value obtained at a second measurement point arranged at a distance from first measurement point. To this end, a differential pressure sensor could be implemented. Such a sensor takes pressure readings from two measurement points simultaneously and delivers as output the pressure difference between those two points. In such an embodiment, the differential pressure sensor can connected to the opening at the first pressure measurement point by means of a first airtight duct, and to the opening at a second pressure measurement point by means of a second airtight duct. The use of a differential pressure sensor gives an absolute measurement of pressure variance, and can be significantly more accurate than, for example, using two absolute pressure sensors with essentially unavoidable different measurement settings due to manufacturing tolerances.

The measurement points can be located at any suitable points on the spinner's windward surface. However, in a particularly preferred embodiment of the invention, the first pressure measurement point is arranged essentially at a geometrical centre of the spinner surface, and the second pressure measurement point is arranged at a distance remote from the first pressure measurement point. With this arrangement, the first measurement point remains essentially stationary when the spinner rotates. If it is placed exactly centrally on the spinner, the first measurement point will in fact rotate about its own centre point. Even if it is not exactly centrally placed, but very close to the geometric centre point, it will only be displaced slightly when the spinner rotates, and may be regarded as essentially stationary. The second measurement point, located further away from the centre, will effectively rotate about the first measurement point as the spinner rotates. The second measurement point will therefore describe an essentially circular path of travel as the spinner rotates. Preferably, the second measurement point is located on the spinner windward face as far away from the first measurement point as possible, i.e. close to an outer edge of the spinner windward face. The placement of the measurement points at the centre of the spinner and at a point further out on the spinner front face ensures a better measurement accuracy or resolution. This arrangement also ensures that any measurement value has a clear "sign", since the centre measurement is fixed and the outer measurement is essentially taken relative to the centre measurement. An advantage of such a spinner is that, by simply forming one or more openings in its windward surface, the spinner can serve the additional purpose of accommodating components of a yaw angle measurement system, so that it is not necessary to mount such components on the outer front face of the spinner or at another position in front of the rotor plane.

As the wind impacts the spinner windward surface, it is forced by this to deflect outward in all directions. Therefore, the pressure measured at the first measurement point at the centre of the spinner surface will essentially be the highest pressure, while the pressure at the second measurement point will be lower. The difference in pressure, or "pressure differential", will be more noticeable the further away from the centre the second measurement point is placed. With this arrangement, the pressure measured at the first measurement point will remain essentially constant, even if the spinner should be angled away from the actual wind direction, i.e. in the event of a yaw angle error. This can occur if the wind should change direction, for example.

For a spinner windward surface that is essentially vertical, the difference in pressure between the first and second measurement points will remain essentially constant when the spinner is facing directly into the wind, and can be visualized as a straight line when the pressure differential is plotted against angle for one full rotation (from 0° through to 360°) of the second measurement point. This is referred to in the following as the "reference pressure differential" for the vertical spinner face.

However, for most large wind turbine designs, the axis of rotation of the spinner is tilted upward by about 6° from the horizontal to provide a safety clearance between the tips of the long rotor blades and the tower. For such an upward tilted spinner, the difference in pressure between the first and second measurement points will oscillate slightly when the spinner is facing directly into the wind, since the pressure in a higher outer region of the spinner windward surface will be somewhat less than the pressure in a lower outer region of the spinner windward surface, and the second measurement point passes through these zones of slightly different pressure. The oscillation in pressure differential can be visualized as one phase of a sine wave when the pressure differential is plotted against angle for one full rotation (from 0° through to 360°) of the second measurement point. This oscillation is referred to in the following as the "reference oscillation" for the upward tilted spinner. For an upward tilted spinner face, the pressure zones are shifted slightly downward. The pressure zones will also shift slightly to the side when the upwardly tilted spinner is not facing correctly into the wind, so that the air pressure measured at the outer measurement point will have a periodic nature since the second measurement point moves through the now significantly different pressure zones along its path of travel. As a result, the periodic differential pressure is laterally offset from the reference oscillation by a phase offset and vertically by an amplitude-shift. The phase offset between this oscillating signal and the reference oscillation will depend primarily on the size or extent of the yaw offset.

To relate the measurement values to the rotation of the spinner, the second measurement point could be arranged in the spinner front face so that it is essentially in line with a longitudinal axis of a particular rotor blade. Therefore, whenever that particular rotor blade passes through its highest point as it rotates with the spinner, the second measurement point has also completed a full revolution.

However, it may be quite difficult to ensure such a precise arrangement. Therefore, in a preferred embodiment of the invention, a reference signal is provided to the yaw error determination unit. The reference signal can be generated by a suitable sensor, for example an accelerometer such as a dual-axis accelerometer; a Hall-effect sensor, etc. Such a sensor can be located at any suitable position, for example inside the spinner, and can transmit a reference value at regular intervals as the spinner rotates. For example, if the sensor is mounted in line with a particular rotor blade, the sensor can deliver an azimuth reference value whenever that rotor blade passes through its highest point. A sensor can be configured to deliver information at certain intervals, for example every quarter rotation, every 30° of rotation, etc. Such a sensor effectively provides a signal indicating a specific angle in the period of the periodic wind measurement data input, for example 15°, 30°, 45°, etc. The sensor output can be used to trigger a pressure measurement, i.e. the differential pressure signal can be sampled as a function of azimuth, so that the pressure differential samples obtained during a single rotation can be used to determine amplitude and phase of the pressure differential signal. The accuracy of the method according to the invention can be favourably high when a sufficient number of differential pressure values or samples is collected for each rotation of the spinner. For example, preferably at least 10, more preferably at least 20, most preferably at least 30 wind pressure measurement values or samples are collected for each revolution of the spinner.

Using the information provided, i.e. the angular reference and the periodic differential pressure samples, a phase offset relative to the reference oscillation can be computed. The phase offset can be estimated using various known techniques. In one approach, a Phase Locked Loop (PLL) could be used. However, techniques such as the PLL suffer from the slow variation of the differential pressure signal and require filtering to filter out the frequency component that corresponds to double the spinner rotation frequency. Furthermore, a PLL is sensitive to amplitude variations. However, the amplitude of the differential pressure signal will vary in direct relationship to the wind speed, which in turn can fluctuate fairly rapidly. Therefore, to use a PLL, the input pressure signal would also require some sort of normalization.

Therefore, in a particularly preferred embodiment of the invention, a processing technique that can better deal with this specific situation is applied. For example, an algorithm such as the Goertzel algorithm is very suitable, since such an algorithm can determine a phase offset over a single revolution of the spinner, i.e. during a single period of the periodic differential pressure signal. The Goertzel algorithm can process a signal having a single frequency component (here, the differential pressure signal is a simple sinusoid with the spinner's frequency of rotation) to deliver a complex output comprising the input signal's amplitude and its phase. The amplitude can be used to determine the wind speed, as will be explained below, while the phase is used to determine the momentary yaw error angle. The Goertzel algorithm is very efficient in terms of numerical computations, especially since only a single frequency component is considered here, and is therefore more suitable than other techniques such as Least Mean Square, Recursive Least Square, Fourier Transform, etc., for implementation on a small processor and/or in an embedded application.

An algorithm such as the Goertzel algorithm is highly robust against amplitude variations, and benefits from a well sampled azimuth or angular reference. Therefore, a suitably precise angular reference sensor is used, preferably a sensor with a resolution of at least 10°, preferably less. For example, an angular reference sensor with a resolution of about 1.0° might preferably be used.

The resolution of the phase offset computation (and therefore of the yaw error determination) can be improved further by estimating the phase over distinct angular sectors. For example, the Goertzel algorithm could be set up to commence at 0°, 90°, 180° and 270° respectively, delivering a new phase estimate every quarter rotation. This would allow the yaw angle error to be determined up to four times for every rotation of the spinner. Clearly, using this information, the yaw drive control of the wind turbine can be operated to respond almost immediately to any change in wind direction. Generally however, it is preferred to not operate or actuate the yaw drive too often, to reduce wear on the yaw drive components. For example, a yaw system might only be active for about 5% of the turbine operational time, in order to achieve a longer life time with low cost equipment. Therefore, in a particularly preferred embodiment of the invention, the yaw error determination may be performed frequently but only used to determine whether an actuation of the yaw drive is appropriate. For example, a phase estimate may be made every quarter rotation of the spinner, but the yaw drive may only be actuated if necessary. The increased resolution described above enables filtering out noisy or high peak fluctuations in wind direction and can therefore determine a more exact estimate of yaw error, so that the yaw drive will only be actuated if this is deemed to be necessary.

The method according to the invention preferably comprise the step of establishing a mathematical relationship expressing phase offset as a function of yaw error angle. This is made possible since the behaviour of the wind passing over the spinner is well-defined and directly related to the rotation of the spinner and the yaw angle. One way of establishing such a relationship can involve a theoretical approach based on computational fluid dynamics. The behaviour of the wind over a spinner can be simulated, and such a simulation can be augmented by using data previously logged by measurement systems on "real-life" wind turbines. For example, a simulation may be set up to determine the pressure distribution over a flat, upwardly tilted spinner at various angles relative to the wind direction, i.e. relative to the wind vector. The method steps (A)-(E) can be carried out entirely in software, using a mixture of logged data previously collected from one or more operational wind turbines (e.g. steps (A) and (B)); data obtained from one or more fluid dynamics models (e.g. step (B)); and data computed in the course of the simulation (e.g. steps (C) and (D)). Pressure measurement data may be provided in step (B) by sensors mounted on a meteorological mast.

Depending on the accuracy of the model(s) used, such a simulation can predict the pressure distribution over the spinner front face, so that a periodic pressure difference can be computed between two points on the spinner, one in the centre and one further out. This computed pressure difference can be analysed to determine how the yaw error (the angle by which the spinner is facing away from the wind vector) is related to a phase offset between the periodic pressure signal and a reference oscillation. During such simulations carried out in the course of the invention, it was observed that the function relating phase offset to yaw error resembles the tan h function.

In a second approach, a wind turbine is calibrated using a yaw angle determination unit according to the invention. To this end, values of phase offset are determined and recorded for a sequence of distinct, known yaw error angles between a first positive yaw error angle and a second negative yaw error angle. For example, step (A) of the method can involve controlling the yaw drive to set a specific known yaw error angle. The current wind direction can be determined using data provided by a meteorological mast, or from another suitable sensor or reliable information source. The wind turbine is allowed to operate as usual. Step (B) involves obtaining wind pressure measurement values during that yaw angle setting. These wind pressure measurement values exhibit the periodic nature described in detail above. The wind pressure measurement values are then processed in step (C) of the method to determine a phase offset of the wind pressure measurement values relative to an angular reference, for example using the Goertzel algorithm described above. Each phase offset thus calculated is recorded in step (D) for the known yaw error angle. These steps are preferably repeated as often as necessary to obtain a reliable correlation between phase offset and yaw error angle.

Preferably, the correlation is determined over a suitably wide range of yaw error angles in order to improve the quality of the measurements and the calibration. Therefore, in a further preferred embodiment of the invention, values of phase offset are determined and recorded for a sequence of distinct yaw error angles between a first maximum yaw error angle and a second maximum yaw error angle. In one preferred embodiment of the invention, the yaw error angle sequence comprises the following sequence of angles: +15°, −15°, +12°, −12°, +9°, −9°, +6°, −6°, +3°, −3°, 0°; assuming that 0° coincides with the wind direction. In other words, the yaw drive is controlled so that the nacelle is first yawed by an angle of +15° out to one side from a virtual line parallel to the wind direction. Wind pressure measurements are collected and recorded for this yaw error angle as the spinner rotates. After a certain time has elapsed, the yaw drive is actuated to yaw the nacelle back through 30° until the nacelle has reached a position of −15° on the other side. At this position, further wind pressure measurements are collected and recorded as the spinner rotates. Then, the yaw drive is actuated to yaw the nacelle back again through 27°, i.e. to a yaw angle of +12°. Again, wind pressure measurements are collected and recorded as the spinner rotates, and the nacelle is then yawed back through 24° to a yaw angle of −12°. The steps are repeated until wind pressure measurements have been collected for each yaw error angle of the sequence. Of course, other suitable angle sequences could be chosen, for example at steps of 4°, or 2°, as appropriate. Performing such a calibration in real life is subject to any inaccuracies imposed by a fluctuating wind speed. Therefore, the measurements are repeated for the given angle sequence numerous times, so that the results can be averaged to reduce variance.

The values of phase offset can be plotted against measured yaw error (whereby the yaw error is established using the known wind direction data and the known angle settings input to the yaw drive). Each phase offset and yaw error value pair corresponds to a point in such a plot or graph. Using established methods for regression or interpolation, a mathematical relationship can be determined between them phase offset and yaw error, i.e. phase offset can be expressed as a function of yaw error. This mathematical relationship is static, i.e. it need only be estimated once for a wind turbine, or for a specific wind turbine type.

This information could be used in a computational module in a wind turbine. For example, a yaw error determination module may comprise a differential pressure sensor, angular reference sensor, etc., as described above, and a processor for computing a yaw error on the basis of an input phase offset value. For example, an algorithm for performing an inverse tan h calculation may be run on the processor. Alternatively, the processor can be used to retrieve a value of yaw error from a look-up table whenever it receives an updated or new value for phase offset. Of course, the processor may also be used to perform any filtering steps on the yaw error signal. The yaw error determination unit can therefore output signals that can be used in the control of the wind turbine. Therefore, in a particularly preferred embodiment of the invention, the yaw error determination unit comprises a yaw drive control signal generating unit for generating a yaw drive control output signal on the basis of the determined yaw error angle.

As mentioned above, the information collected by the pressure sensor can be used to determine the wind speed. The wind speed can be used to improve the safety and efficiency of the wind turbine, for example by determining when the wind turbine should be shut down. At high wind speeds, the rotor blades should be furled or pitched "out of the wind" in order to avoid damage to the blades, generator, prevent overspeed etc. It is also important to ensure that the blade tip speed is kept within safe limits. Furthermore, for a wind turbine that was previously shut down, the wind speed measurements can be analysed over a time period to determine whether the wind turbine should be started again. This may be the case once the average wind speed exceeds a certain minimum, while it may be deemed preferable to leave the wind turbine shut down as long as the average wind speed is below that minimum.

The dynamic pressure of the incoming wind airflow is the difference between the stagnation pressure (at the first measurement point) and a static or total pressure measured using a value of ambient pressure. To this end, in a particularly preferred embodiment of the invention, the measurement system comprises an additional ambient pressure measurement input, for example leading from a point anywhere in the spinner and connected to the pressure sensor. Preferably, the pressure sensor can deliver a value of dynamic pressure using these inputs. Knowing the dynamic pressure, the wind speed can be calculated using the formula:

$$q = \frac{1}{2}\rho v^2$$

where q is the dynamic pressure in Pascal, $\rho$ is the density of air in kg/m$^3$, and v is the wind speed. The calculated wind speed value can be used, as indicated above, to determine when to start or stop the wind turbine.

In a further preferred embodiment of the invention, therefore, the analysis module comprises a wind speed limit determination module, wherein a control signal generated by the wind speed limit determination module comprises a start-up/shut-down signal for a controller of the wind turbine, which start-up/shut-down signal is generated on the basis of the wind speed value derived from the dynamic pressure. Therefore the wind speed can be calculated by measuring first a reference pressure $P_{ref}$ and velocity $v_{ref}$. Using a value of amplitude output by the algorithm block, for example from a Goertzel algorithm block, the wind speed can be calculated directly using the above formula.

The output wind speed value can be filtered, depending on the subsequent use of the signal. For example, a filter may be used to compute a running average of several consecutive wind speed values, so that a more reliable value can be established.

Of course, the processor may also be used to run software modules capable of using the differential pressure measurements to also compute a value of wind speed, and to perform any filtering steps for averaging such wind speed values. Such a wind speed signal can be used to control components of the wind turbine such as a start-up/shut-down controller, a blade pitch controller, etc.

BRIEF DESCRIPTION OF THE DRAWINGS

Other objects and features of the present invention will become apparent from the following detailed descriptions considered in conjunction with the accompanying drawings. It is to be understood, however, that the drawings are designed solely for the purposes of illustration and not as a definition of the limits of the invention.

In the diagrams, like numbers refer to like objects throughout. Objects in the diagrams are not necessarily drawn to scale.

DETAILED DESCRIPTION OF INVENTION

Figure 1:
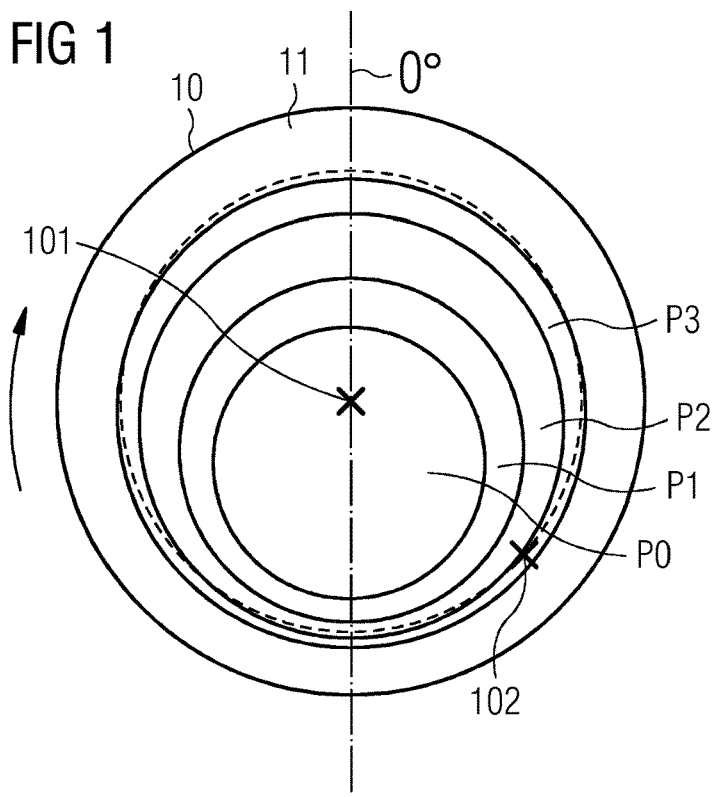
FIG. 1 shows pressure distributions for a first orientation of a flat spinner of a wind turbine according to an embodiment of the invention.

FIG. 1 shows pressure distributions over the surface of a flat spinner 10 of a wind turbine according to the invention, in a first and second position of the spinner 10. Here, it is assumed that the spinner 10 is essentially circular in shape, with an essentially circular front face 11, and is mounted on the wind turbine such that the front face 11 is tilted upward by a small angle of about 6° for the reasons given above. In this diagram, the spinner 10 is facing directly into the wind. The pressure distribution over the flat spinner face 11 when tilted slightly upward is such that a highest pressure is present in a first pressure zone P0 slightly offset in a downward direction from the geometric centre (indicated by an "x") of the circular spinner face 11. The pressure drops with increasing distance from the region of highest pressure P0, and this is indicated, for the sake of simplicity, by discrete pressure zones P1, P2, P3 of decreasing pressure, whereby the pressure zone P3 at the outermost edge of the spinner exhibits the lowest pressure. The pressure zones P0, P1, P2, P3 are established essentially symmetrically about a vertical axis through the centre of the spinner front face when this is facing directly into the wind, as indicated by the dashed vertical line. Of course, the pressure does not drop stepwise over discrete pressure zones P0, P1, P2, P3, as indicated here, but drops smoothly from a highest pressure at the spinner centre to a lowest pressure at the perimeter of the spinner face.

The pressure distribution remains the same while the spinner rotates (indicated by the arrow), so that a first point 101 essentially remains within the first pressure zone P0, while a second point 102 describes a circular path of travel (indicated by the dotted line) that takes it through several outer pressure zones P2, P3. Therefore, while the pressure at the first point 101 remains essentially constant, the pressure acting on the second point 102 increases and decreases in a cyclic manner as the spinner 10 rotates and the second point 102 passes in and out of the different pressure zones P2, P3 on its circular path of travel from 0° at its azimuth or highest point on the spinner front face 11 through 180° at its lowest point on the spinner front face 11. A point of lowest pressure is therefore at the highest point of the path of travel, since this is furthest away from the stagnation pressure point 101; while the highest pressure is experienced at the lowest point of the path of travel, since this point is closest to the stagnation pressure point 101. The highest and lowest pressure points are diametrically opposed about the first point 101.

Figure 2:
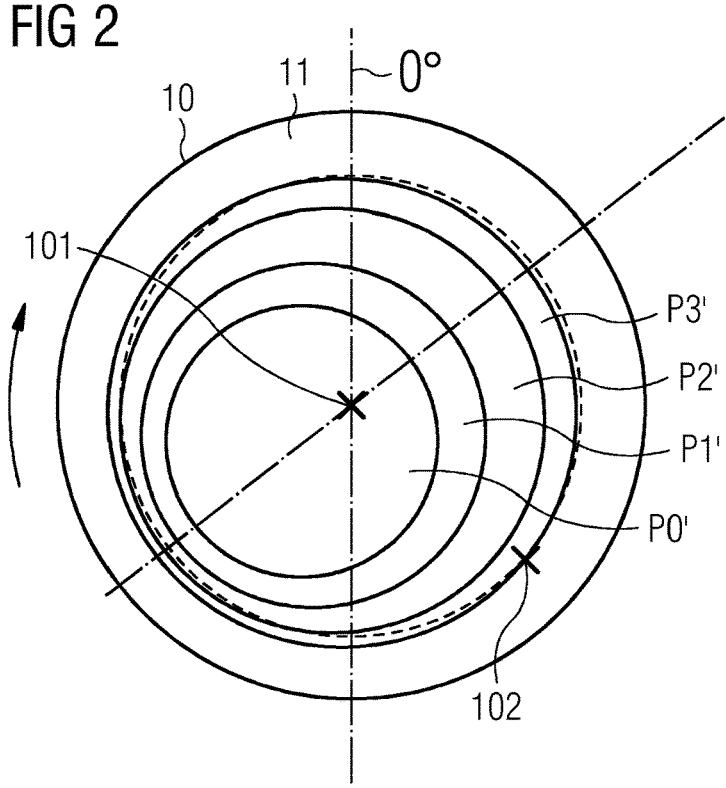
FIG. 2 shows pressure distributions for a second orientation of the spinner of FIG. 1.

FIG. 2 shows a situation in which the spinner 10 no longer faces directly into the wind, but instead faces into the wind at a detrimental yaw angle offset. The effect of this yaw angle error is that the pressure zones are no longer arranged symmetrically about a vertical axis over the spinner front face. Instead, the pressure zones P0', P1', P2', P3' are now also "offset" and somewhat distorted. As a result, the second point 102 now passes in and out of several pressure zones P1', P2', P3'. In this offset yaw error position, therefore, the lowest and highest pressures experienced at the second measuring point 102 will be slightly lower than the corresponding pressures experienced at the second measuring point 102 in the non-offset position of FIG. 1 (again, the highest and lowest pressure points are diametrically opposed about the first point 101, indicated here by the straight slanted broken line passing through these points).

Figure 3:
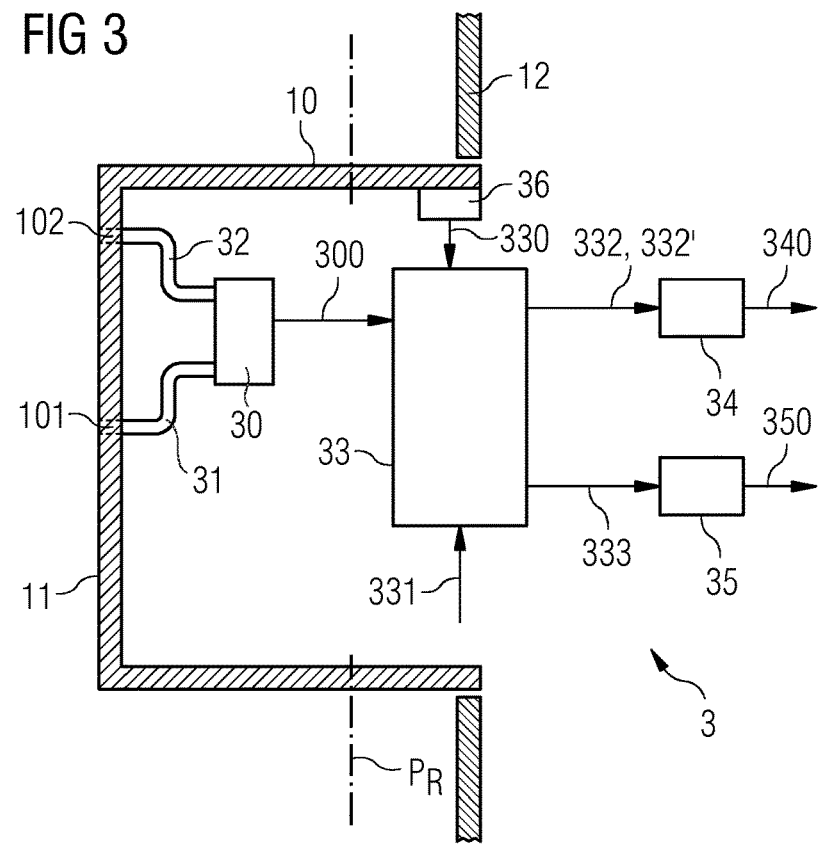
FIG. 3 is a schematic cross-section through the spinner of FIGS. 1 and 2.

This effect is put to good use by the invention, as illustrated in FIG. 3. Here, the spinner 10 of the wind turbine, mounted at the front of a nacelle 12, has two openings 101, 102 or measurement points 101, 102 for making pressure measurements for a yaw error determination unit 3, arranged such that a first opening 101 is situated essentially in the geometric centre of the spinner's front face 11, and a second opening 102 is situated relatively close to an outer edge of the spinner front face 11. Since the openings 101, 102 are in the spinner front face 11, they are in front of a rotor plane $P_R$, in which the rotor blades (not shown) of the wind turbine rotate. As described above with the aid of FIGS. 1 and 2, essentially unchanging or stagnation pressure will be experienced at the first opening 101 or measurement point 101 as the spinner 10 rotates, while the second measurement point 102 will experience a cyclically changing pressure as it repeatedly passes through regions of higher and lower pressure. A differential pressure sensor 30 is arranged in a cavity behind the front face 11 of the spinner 10, and is connected to the openings 101, 102 by means of ducts 31, 32. The differential pressure sensor 30 outputs a differential pressure value 300, which can be transmitted as an electrical signal via wire and a slip ring, or via a wireless signal, indicating the difference in pressure between the openings 101, 102. The output 300 of the differential pressure sensor 30 is received by a computation module 33, which may be realised on a processor. In this embodiment, the computation module 33 of the yaw error determination unit 3 can determine a yaw angle error value 332, 332' and a wind speed value 333 on the basis of the pressure sensor output 300. The yaw error determination unit 3 also comprises a yaw drive control signal generating unit 34 which can generate yaw drive control signals 340 for a yaw drive to correct the yaw angle error, and an on/off control signal generating unit 35 for generating turbine control signals 350 for shutting down or re-starting the wind turbine depending on the wind speed.

A very accurate pressure sensor 30 can permit an exact estimation of the yaw error angle and a correspondingly precise control of the yaw drive, so that the wind turbine to which this spinner 10 is attached can optimise its energy output. As mentioned above, the computation module 33 or analysis unit 33 further comprises a wind speed determination module that can determine the wind speed 333, for example a mean wind speed, on the basis of the pressure sensor output 300. The wind speed value 333 could be used, for example, to generate a start-up/shut-down signal for a controller of the wind turbine. This data might also be used to determine an optimal blade pitch angle for the wind turbine rotor blades during a constant speed turbine control procedure, in which the wind turbine power has reached a rated level and during which the pitch angle may be adjusted as required using estimated wind speed values. In this embodiment, an azimuth signal sensor 36 provides an azimuth reference value 330 for the yaw error determination unit 3, as will be explained below.

Figure 4:
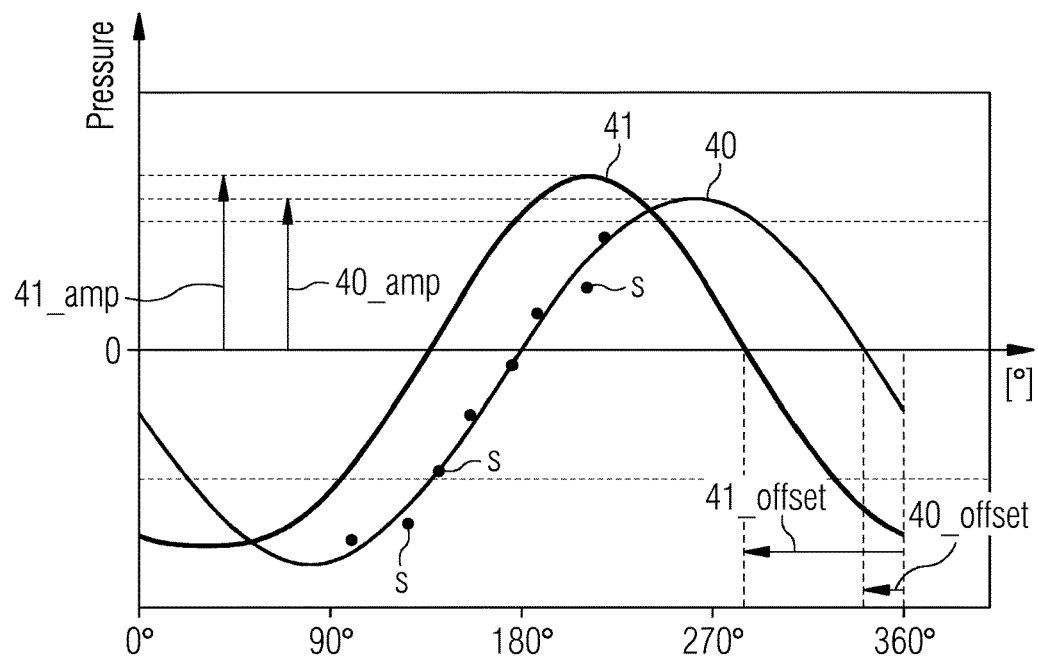
FIG. 4 shows graphs of differential pressure curves for one revolution of the spinner of FIGS. 1 to 3.

FIG. 4 shows two graphs of differential pressure curves 40, 41 for one revolution of the spinner 10 from 0° through 360°. A first graph 40 corresponds to a first yaw error angle, and is characterized by a sinusoidal oscillation 40 of differential pressure with an offset 40_offset and an amplitude 40_amp. A second graph 41 corresponds to a second yaw error angle, and is also characterized by a sinusoidal oscillation 41 of differential pressure with an offset 41_offset and an amplitude 41_amp. The differential pressure sensor 30 arranged behind the spinner front face 11 can collect measurements or samples S made at regular angular intervals, for example every 10°, every 20°, etc., as indicated by the exemplary sample points S arranged along the first graph 40. The method according to the invention makes it possible to relate such differential pressure measurements S to yaw angle errors, as explained above. For example, a Goertzel algorithm can be run using these samples S and an angular reference as input to determine amplitude and phase of the periodic differential pressure signal underlying those samples S.

Figure 5:
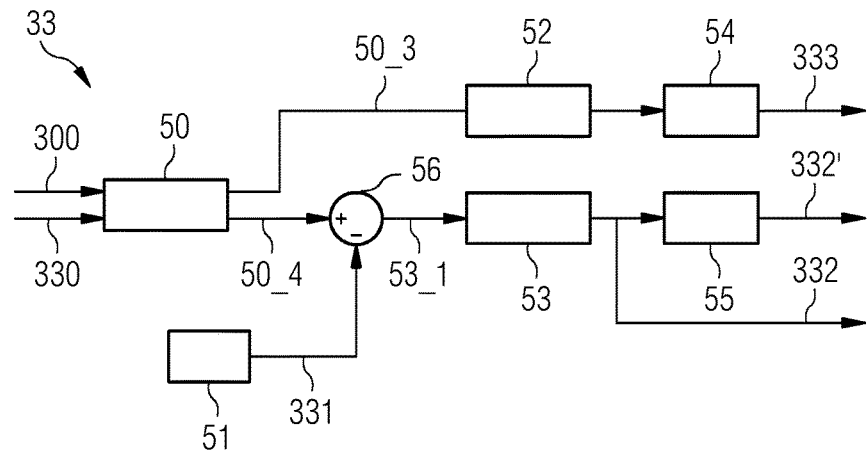
FIG. 5 shows a block diagram of an embodiment of a computation module for carrying out the steps of the method according to the invention for determining the yaw error.

FIG. 5 shows a block diagram of an embodiment of a computation module 33 for carrying out the steps of the method according to the invention for determining the yaw error. A Goertzel algorithm block 50 is given differential pressure values 300 (corresponding to the sample points S of FIG. 4) and an azimuth reference value 330. The output of the Goertzel algorithm block 50 is a value of amplitude 50_3 and a value of phase offset 50_4. A phase offset block 51 provides a "handle" or phase correcting signal 331. This phase correcting signal is combined by way of a summing point 56 with phase offset 50_4 to apply a correction to the calculated phase, which in turn is dependent on the source of the azimuth input. The phase correcting signal 331 can also be delivered by the azimuth signal sensor 51 or can be derived from this. For example, if the azimuth is defined to be 0° when a specific rotor blade is pointing vertically upwards, and the pressure sensor is mounted at a random angle relative to that azimuth on the rotor plane, then the phase output from the Goertzel algorithm block 50 will be relative to that blade. The correcting signal 331 corrects the phase offset 50_4 by the angle defining the sensor's position relative to the azimuth, so that a corrected phase offset 53_1 of 0° will correspond to a yaw angle of 0°. The corrected phase offset 53_1 is forwarded to a look-up table 53. Here, the yaw error 332 is determined by fetching the yaw error value 332 that corresponds to that phase offset input 53_1. The yaw error 332 can then be filtered in a filter block 55, which delivers a filtered yaw error value 332', for example for use in a yaw drive controller. The amplitude 50_3 output by the Goertzel algorithm block 50 can also be used to determine the wind speed. In a Bernoulli computation block 52, the Bernoulli equation is applied to determine the wind speed, which values are then filtered in a further filter block 54 to obtain averaged wind speed values 333, which may be used, as mentioned above, to generate a start/stop signal for the wind turbine.

Figure 6:
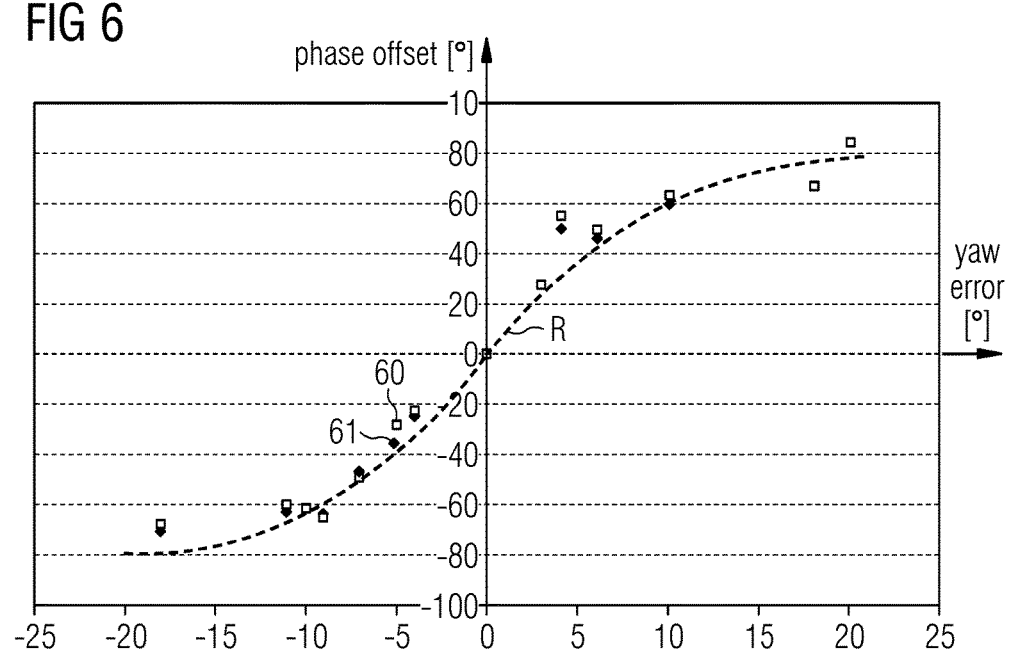
FIG. 6 shows a mathematical relationship between phase offset and yaw error, established by an embodiment of the method according to the invention.

FIG. 6 shows a mathematical relationship R established during the course of experiments carried out for the present invention, as a graph of phase offset (Y-axis, [°]) against yaw error (X-axis, [°]), and also shows amplitude values 60, 61 output by the Goertzel algorithm block 50 during a yaw error estimation procedure. The diagram shows, after interpolation, that the relationship R displays characteristics of a tan h function. Therefore, regarding a measured phase offset as a "y" value of the tan h function, the corresponding "x" value, i.e. the yaw error value, can be computed by performing a suitable inverse tan h computation. Here, a phase offset of about 60° is shown to correspond to a yaw error of about 10°, while a phase offset of about −40° is shown to correspond to a yaw error of about −5°. Clearly, with relatively little computational effort (the Goertzel algorithm requires very few computations), and in a relatively brief duration (the yaw error can simply be retrieved from a look-up table), a quite precise determination of the actual yaw angle error can be determined. This yaw angle error can be used by a yaw drive to correct the orientation of the spinner into the wind, so that the power output of the wind turbine is always optimized. Over time, this can increase the annual energy output of the wind turbine by a considerable amount.

Figure 7:
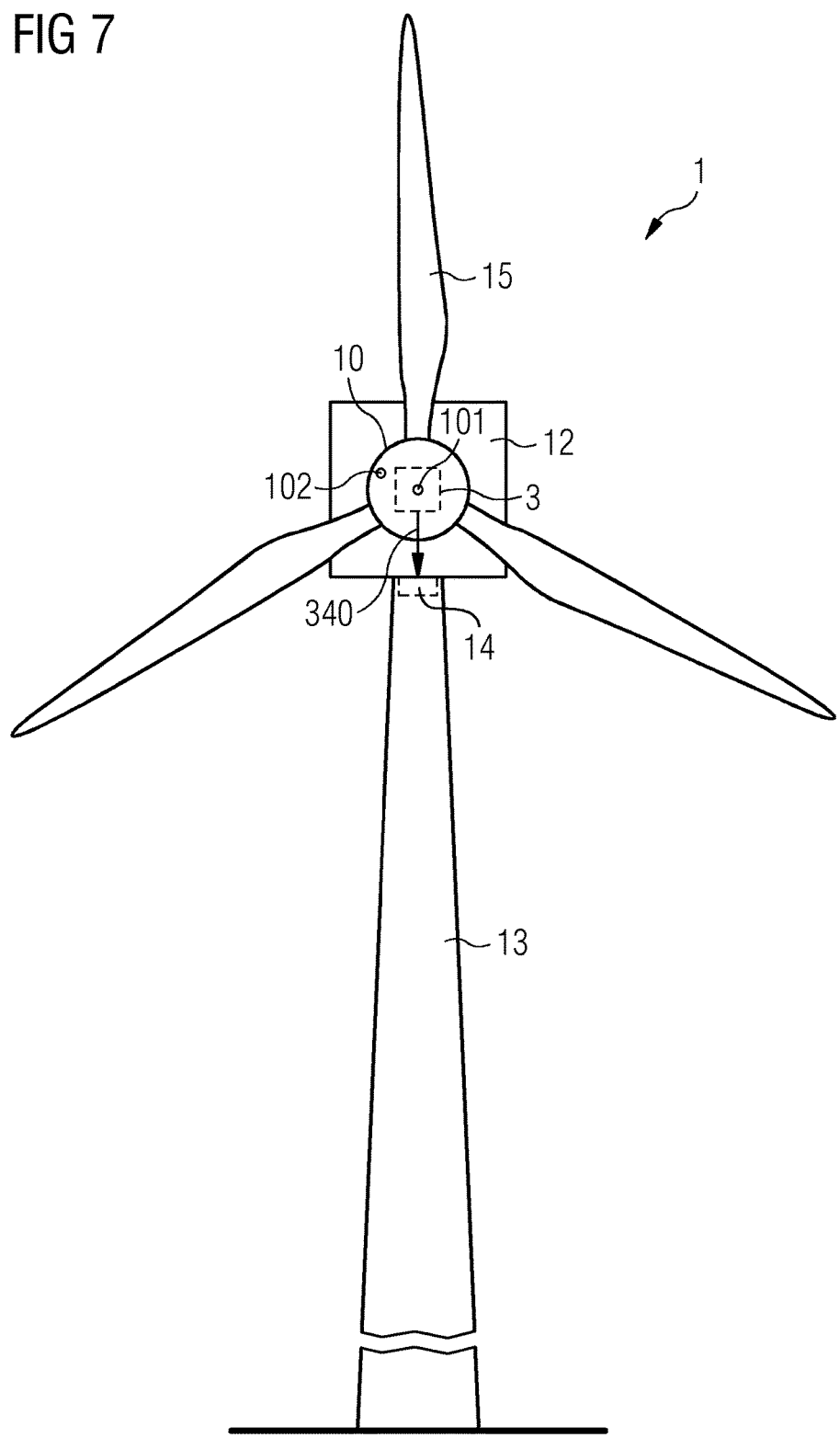
FIG. 7 shows a wind turbine according to an embodiment of the invention.

FIG. 7 shows a wind turbine 1 according to an embodiment of the invention. A flat spinner 10 is mounted to a nacelle 12 rotatably mounted on a tower 13 by a yaw drive 14. Here, three rotor blades 15 are mounted to the spinner 10. A yaw error determination unit 3 is incorporated inside the spinner 10, and a differential pressure sensor is connected to two openings 101, 102 (shown here greatly exaggerated) on the spinner front face 11. An angular reference sensor delivers a sample trigger signal to the pressure sensor at regular angular intervals as the spinner rotates. The yaw error is determined in the yaw error determination unit as described above, on the basis of the samples of differential pressure delivered by the pressure sensor, and the estimated or determined yaw error value is used to generate a yaw drive control signal 340, which can actuate the yaw drive as necessary to correct the alignment of the spinner so that this is always facing directly into the wind. The yaw drive can be actuated at certain predetermined intervals to avoid an over-activity and unnecessary wear, for example a yaw error correction can be carried out (if necessary) once per minute, once every 5 minutes, etc.

Figure 8:
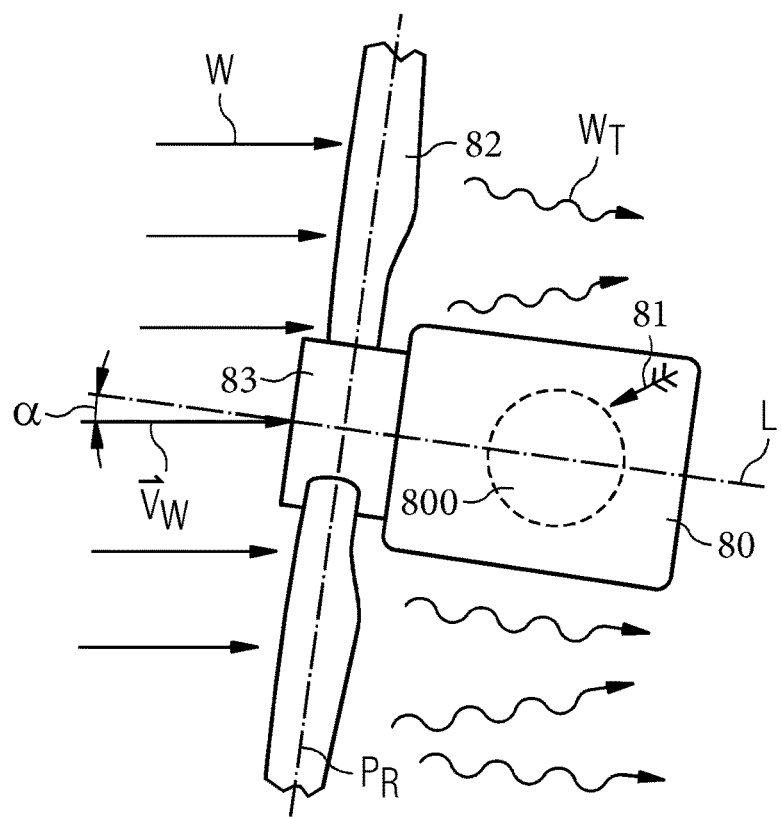
FIG. 8 shows a schematic representation of a plan view of a prior art wind turbine in a non-ideal position relative to the wind.

FIG. 8 shows a schematic representation of a plan view of a prior art wind turbine in a non-ideal position relative to the wind W. Seen from above, a nacelle 80 can be rotated by a yaw drive 800 (indicated by the broken line) with the intention of bringing a longitudinal axis L of the nacelle 80 and spinner 83 into line with the momentary direction $v_W$ of the wind W. A controller of the yaw drive 800 acts in response to measurements delivered by a wind vane 81 mounted on the top of the nacelle 80. The rotor blades 82 describe a virtual "rotor disc" or "rotor plane" $P_R$ as they rotate, indicated here by the broken line (whereby the rotor plane $P_R$ is perpendicular to the plane of the drawing). Because the wind vane 101 is situated behind the rotor plane $P_R$, and the rotor blades 104 cause a certain amount of turbulence $W_T$ behind the rotor plane, the measurements delivered by the wind vane 81 cannot accurately and reliably describe the wind direction $v_W$. As a result, the yaw drive controller may erroneously cause the nacelle 80 and therefore also the spinner 83 to face in a direction offset from the ideal wind direction. This offset or yaw angle error is shown here as an angle α between the longitudinal axis L and the wind direction $v_W$. Because of the yaw angle error α and the resulting load imbalance, any major component of the wind turbine may be negatively affected. For example, the rotor blades 82 and bearings such as pitch bearings or bearings of the rotor or main shaft of the generator may be subject to undesirable fatigue loading. Also, because of the less than ideal orientation into the wind, the energy output of this wind turbine is lower than it would be if the wind turbine were facing directly into the wind.

Although the present invention has been disclosed in the form of preferred embodiments and variations thereon, it will be understood that numerous additional modifications and variations could be made thereto without departing from the scope of the invention. For example, the method according to the invention might also include data quality routines for validating the azimuth signal and pressure signals. The method according to the invention might also include safety routines for stopping the turbine should the pressure measurements be determined to be unreliable, or for switching to secondary anemometry devices.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

We claim:

1. A method of determining a degree of yaw error of a wind turbine comprising a spinner with a flat disc-shaped windward surface, comprising:

obtaining wind pressure measurement values from in front of a rotor plane, which wind pressure measurement values exhibit a periodic nature related to a rotation of the spinner;

performing, by a processor, signal processing to process the wind pressure measurement values to determine a phase offset of the wind pressure measurement values relative to an azimuth reference;

deriving, by the processor, complex values based on the signal processing performed on the wind pressure measurement values, the complex values comprising 1) amplitude values and 2) phase offset values relative to the azimuth reference;

applying by way of a summing point a correction to the phase offset values to generate a corrected phase offset relative to the azimuth reference, retrieving from a lookup table a yaw error angle based on the corrected phase offset;

processing the amplitude values to determine wind speed; and rotating, by a controller, a nacelle of the wind turbine relative to a tower of the wind turbine based on the yaw error angle, wherein the pressure measurement values are obtained at a number of measurement points arranged in the spinner windward surface, wherein the spinner windward surface precedes or coincides with the rotor plane of the wind turbine, wherein the wind speed is used to control at least one component of the wind turbine.

2. The method according to claim 1, wherein each wind pressure measurement value of the wind pressure measurement values comprises a pressure differential between a first pressure value obtained at a first measurement point arranged essentially at the center of the spinner windward surface and a second pressure value obtained at a second measurement point arranged at a distance from first measurement point.

3. The method according to claim 1, wherein the performing signal processing comprises applying a Goertzel algorithm to process the wind pressure measurement values.

4. The method according to claim 3, further comprising applying a plurality of Goertzel algorithms to process the wind pressure measurement values, wherein each Goertzel algorithm is associated with a distinct angular sector.

5. The method according to claim 1, further comprising establishing a mathematical relationship expressing the yaw error angle as a function of phase offset.

6. The method according to claim 1, wherein at least 10 wind pressure measurement values are obtained for each revolution of the spinner of the wind turbine.

7. The method according to claim 6, wherein at least 20 wind pressure measurement values are obtained for each revolution of the spinner of the wind turbine.

8. The method according to claim 7, wherein at least 30 wind pressure measurement values are obtained for each revolution of the spinner of the wind turbine.

9. A method of establishing a relationship between a phase offset of wind pressure measurement values and a degree of yaw error of a wind turbine comprising a spinner with a flat disc-shaped windward surface, the method comprising:

setting a specific yaw angle;

obtaining wind pressure measurement values from in front of a rotor plane for that yaw angle, which wind pressure measurement values exhibit a periodic nature related to a rotation of the spinner, and wherein the wind pressure measurement values are obtained at a number of measurement points arranged in the spinner windward surface of the wind turbine, wherein the spinner windward surface precedes or coincides with the rotor plane of the wind turbine;

performing, by a processor, signal processing on the wind pressure measurement values to determine the phase offset of the wind pressure measurement values relative to an angular reference;

deriving, by the processor, complex values based on the signal processing performed on the wind pressure measurement values, the complex values comprising 1) amplitude values and 2) phase offset values relative to the azimuth reference;

applying by way of a summing point a correction to the phase offset values to generate a corrected phase offset relative to the azimuth reference, retrieving from a lookup table a yaw error angle based on the corrected phase offset;

recording the corrected phase offset for the yaw angle;

repeating the setting, the obtaining, the performing, the deriving, the applying and the retrieving for a plurality of distinct yaw angles; and rotating, by a controller, a nacelle of the wind turbine relative to a tower of the wind turbine based on the yaw error angle.

10. The method according to claim 9, wherein values of phase offset are determined and recorded for a sequence of distinct yaw error angles between a first maximum yaw error angle and a second maximum yaw error angle.

11. The method according to claim 10, wherein the yaw error angle sequence comprises the sequence of angles $\{15°, -15°, 12°, -12°, 9°, -9°, 6°, -6°, 3°, -3°, 0°\}$.

12. A system for determining a degree of yaw error of a wind turbine comprising a spinner with a flat disc-shaped windward surface, the system, comprising:

a sensor arrangement providing wind pressure measurement values obtained at a number of pressure points arranged in the spinner windward surface, wherein the spinner windward surface precedes or coincides with the rotor plane of the wind turbine and exhibiting a periodic nature related to a rotation of the spinner of the wind turbine;

a processor configured to process the wind pressure measurement values to determine a phase offset of the pressure measurement values relative to an azimuth reference input; and the processor configured to derive complex values based on the wind pressure measurement values, the complex values comprising 1) amplitude values and 2) phase offset values relative to the azimuth reference, a summing point to apply a correction to the phase offset values to generate a corrected phase offset relative to the azimuth reference;

a lookup table to retrieve a yaw error angle based on the corrected phase offset;

the processor configured to process the amplitude values to determine wind speed, wherein the processor generates a yaw drive control output signal on the basis of the retrieved yaw error angle, wherein the yaw drive control output signal is used by a yaw drive of the wind turbine to rotate a nacelle of the wind turbine relative to a tower of the wind turbine, wherein the processor is configured to generate at least one control signal based on the wind speed to control at least one component of the wind turbine.

13. The system according to claim 12, wherein the angular reference input is provided from a spinner angular position sensor.

14. The wind turbine, comprising:

the system according to claim 12 that determines the degree of yaw error of the wind turbine;

the nacelle rotatably mounted on the tower;

the yaw drive for rotating the nacelle relative to the tower; and the spinner with the flat disc-shaped windward surface, rotatably mounted to the nacelle, and a number of rotor blades mounted to the spinner;

wherein the sensor arrangement of the system is connected to a first measurement point and a second measurement point arranged on the front face of the spinner, and wherein the yaw drive rotates the nacelle relative to the tower using the yaw drive control output signal determined by the processor.

15. The wind turbine according to claim 14, wherein the sensor arrangement is arranged behind the windward surface of the spinner.

* * * * *